(12) United States Patent
Propp et al.

(10) Patent No.: US 8,040,966 B2
(45) Date of Patent: Oct. 18, 2011

(54) COMMUNICATION DATA USING WIDEBAND COMMUNICATIONS

(75) Inventors: Michael B. Propp, Brookline, MA (US); Khaled Saab, Randolph, MA (US)

(73) Assignee: Ceres Communications Technologies, LLC, Wilmington, DE (US)

( * ) Notice: Subject to any disclaimer, the term of this patent is extended or adjusted under 35 U.S.C. 154(b) by 0 days.

(21) Appl. No.: 12/981,245

(22) Filed: Dec. 29, 2010

(65) Prior Publication Data

US 2011/0176664 A1     Jul. 21, 2011

Related U.S. Application Data

(60) Continuation of application No. 12/471,146, filed on May 22, 2009, which is a division of application No. 10/488,179, filed as application No. PCT/US02/27568 on Aug. 30, 2002, now Pat. No. 7,542,513.

(60) Provisional application No. 60/315,950, filed on Aug. 31, 2001.

(51) Int. Cl.
*H04L 27/28* (2006.01)

(52) U.S. Cl. ........................................ 375/260

(58) Field of Classification Search ................ 375/222, 375/260
See application file for complete search history.

(56) References Cited

U.S. PATENT DOCUMENTS

| 7,013,257 | B1 * | 3/2006 | Nolan et al. ............... 703/28 |
| 7,276,970 | B2 * | 10/2007 | Khorramabadi ............ 330/253 |

* cited by examiner

*Primary Examiner* — Don N Vo
(74) *Attorney, Agent, or Firm* — Hershkovitz & Associates, LLC; Abraham Hershkovitz

(57) ABSTRACT

This disclosure relates to varying load and modulation applied to each of multiple frequency subchannels based on anticipated attenuation experienced by those subchannels. Communicating data includes identifying a static component of a transmission medium for wideband communications having at least two subchannels determining a function of noise is attenuation versus frequency for the static component selecting wideband modulation schemes for the subchannels based on the function determined and communicating a data signal over the subchannels. The transmission medium includes a medium other than a copper telephone wire between and including a carrier facility and a termination of the copper telephone wire at an access point at a user premise and copper telephone wire in a cable riser in multitenant units and multi-dwelling buildings. Independent demodulation functions may be applied to at least two of the subchannels.

14 Claims, 10 Drawing Sheets

600

| Parameters | |
|---|---|
| Raw Bit Rate | 100 Mbps |
| FEC overhead | 2:1 |
| Propagation Delay @ 7.5 kft | 11.43 μs |
| Block size (Header, Body, CRC) (bytes) | (2, 64, 2) |
| Blocks per frame | 32 |

Throughput vs. Post-FEC BER

| BER | Block Error Rate | Throughput (Mbps) |
|---|---|---|
| $10^{-4}$ | 5.4% | 40.8 |
| $10^{-5}$ | .5% | 42.9 |
| $10^{-6}$ | .05% | 43.1 |

Fig. 6

COMMUNICATION DATA USING WIDEBAND COMMUNICATIONS

CROSS-REFERENCE TO RELATED APPLICATIONS

The application is a Continuation application of U.S. patent application Ser. No. 12/471,146, filed May 22, 2009, which is a Divisional application of U.S. application Ser. No. 10/488,179, filed Nov. 3, 2004 now U.S. Pat. No. 7,542,513, which is a National Stage of International Application No. PCT/US02/27568, filed Aug. 30, 2002, which claims the benefit of U.S. Provisional Application No. 60/315,950, filed Aug. 31, 2001, which is incorporated herein by reference.

TECHNICAL FIELD

This document relates to communicating data using wideband communications.

BACKGROUND

In data communications, wideband transmission may be used. However, the received signal may be impaired by noise and frequency-dependent channel attenuation. For example, an entire portion of the transmitted signal may fall into an attenuation null and be severely attenuated. In addition, the intersymbol interference (ISI) and/or interchannel interference (ICI) could degrade the signal, causing a high bit error rate and rendering an error correction engine less impactful.

SUMMARY

In one general aspect, communicating data includes identifying a static component of a transmission medium for wideband communications having at least two subchannels. A function of noise or attenuation versus frequency is determined for the static component. Wideband modulation schemes are selected for the subchannels based on the function determined and a data signal is communicated over the subchannels. The transmission medium includes a medium other than a copper telephone wire between and including a carrier facility and a termination of the copper telephone wire at an access point at a user premise and copper telephone wire in a cable riser in multi-tenant units and multi-dwelling buildings.

Implementations may include one or more of the following features. For example, the transmission medium may include a copper telephone wire between the access point at the user premise and a termination of the copper telephone wire within the user premise, a power line, a cable line, a telephone wire other than a copper telephone wire, and/or a radio frequency medium.

The selected wideband modulation schemes may be independently applied to each of the subchannels. The selected wideband modulation schemes may be applied using separate modulators for each of the subchannels.

In one implementation, the static component may be independently identified on each of the subchannels. The function of noise or attenuation versus frequency may be determined for the static component of each of the subchannels. A wideband modulation scheme may be selected to optimize throughput on each of the subchannels based on the function determined on each of the subchannels.

A measurement of the noise or attenuation versus frequency may be taken at a time interval other than a frame-by-frame time interval and the function of the noise or the attenuation versus the frequency may be determined for the static component based on the measurement. The wideband modulation scheme may be selected at a time of the measurement based on the function determined. The function of the noise or the attenuation versus the frequency may be determined by averaging a function of noise or attenuation versus frequency for the static component over a period of time.

The static component may include noise as a relatively static function of frequency, attenuation as a relatively static function of frequency, or noise and attenuation as a relatively static function of frequency.

A dynamic component of the transmission medium for the wideband communications may be identified. An adaptive filter may be created based on the dynamic component and the adaptive filter may be applied to the communicated data signal at a receiver. The adaptive filter may be applied to the communicated data signal on each of the subchannels for the wideband communication. The adaptive filter may include a noise filter, a channel filter, and/or a frequency-domain equalizer.

The static component may be static relative to the dynamic component. The dynamic component may include noise that varies as a function of frequency, attenuation that varies as a function of frequency, or noise and attenuation that vary as a function of frequency.

A channel filter may be created by averaging elements of the channel filter based on the static component and the channel filter may be applied to the communicated data signal at a receiver. A noise filter may be created by averaging elements of the noise filter based on the static component and the noise filter may be applied to the communicated data signal at a receiver. A frequency-domain equalizer may be created by averaging elements of the frequency-domain equalizer based on the static component and the frequency-domain equalizer may be applied to the communicated data signal at a receiver.

A filter may be created by averaging the function of noise versus the frequency and the filter may be applied to the communicated data signal at a receiver.

A filter may be created by averaging the function of attenuation versus the frequency and the filter may be applied to the communicated data signal at a receiver. A filter may be created by averaging the function of noise and attenuation versus the frequency and the filter may be applied to the communicated data signal at a receiver.

Independent demodulation functions may be applied for at least two of the subchannels. Separate demodulators may be used to apply the demodulation functions for the subchannels. Separate demodulation algorithms may be used to apply the demodulation functions for the subchannels.

Modulation schemes may be selected for at least two subchannels to optimize orthogonality between each of the subchannels. The modulation schemes may include offset quadrature amplitude modulation (OQAM) schemes.

A forward error correction code may be selected based on a length of a frame and a rate of retransmission. An error detection code may be selected to determine a level of error detection and a rate of retransmission.

An acknowledgement for a retransmission of previously transmitted data communicated across the transmission medium may be attached to new data. A data block that requires retransmission also may be attached to the new data. An acknowledgement for correct reception of previously transmitted data communicated across the transmission medium may be attached to new data.

In another general aspect, communicating data includes in a first transmitter on a first channel, detecting a state of communications by a second transmitter over a second channel and synchronizing transmissions by the first transmitter with transmissions by the second transmitter based on the state detected. The first channel and the second channel may be included in a transmission medium other than a copper telephone wire between and including a carrier facility and a termination of the copper telephone wire at an access point at a user premise and copper telephone wire in a cable riser in multi-tenant units and multi-dwelling buildings.

Implementations may include one or more of the following features. For example, the first channel may include a first wire and the second channel may include a second wire that differs from the first wire. The transmission medium may include a copper telephone wire between the access point at the user premise and a termination of the copper telephone wire within the user premise, a power line, a cable line, a telephone wire other than a copper telephone wire, and/or a radio frequency medium. The state of communications may include a receiving state and/or a transmitting state.

In another general aspect, communicating data includes identifying frequencies in a wideband communication channel that require reduced emissions and applying a digital frequency-domain filter to a transmitted signal to reduce the emissions of the identified frequencies. The wideband communication channel is over a transmission medium that includes a medium other than a copper telephone wire between and including a carrier facility and a termination of the copper telephone wire at an access point at a user premise and copper telephone wire in a cable riser in multi-tenant units and multi-dwelling buildings.

Implementations may include one or more of the following features. For example, the transmission medium may include a copper telephone wire between the access point at the user premise and a termination of the copper telephone wire within the user premise, a power line, a cable able line, a telephone wire other than a copper telephone wire, and/or a radio frequency medium. The identified frequencies may be identified by a regulatory agency for reduced emissions. The identified frequencies may include frequencies that interfere with other devices or communications.

These general and specific aspects may be implemented using a system, a method, or a computer program, or any combination of systems, methods, and computer programs.

Other features will be apparent from the description and drawings, and from the claims.

DESCRIPTION OF DRAWINGS

FIG. 6 is a table illustrating throughput versus dynamically varying bit error rates (BERs) for an exemplary set of parameters.

Like reference symbols in the various drawings may indicate like elements.

DETAILED DESCRIPTION

Figure 1:
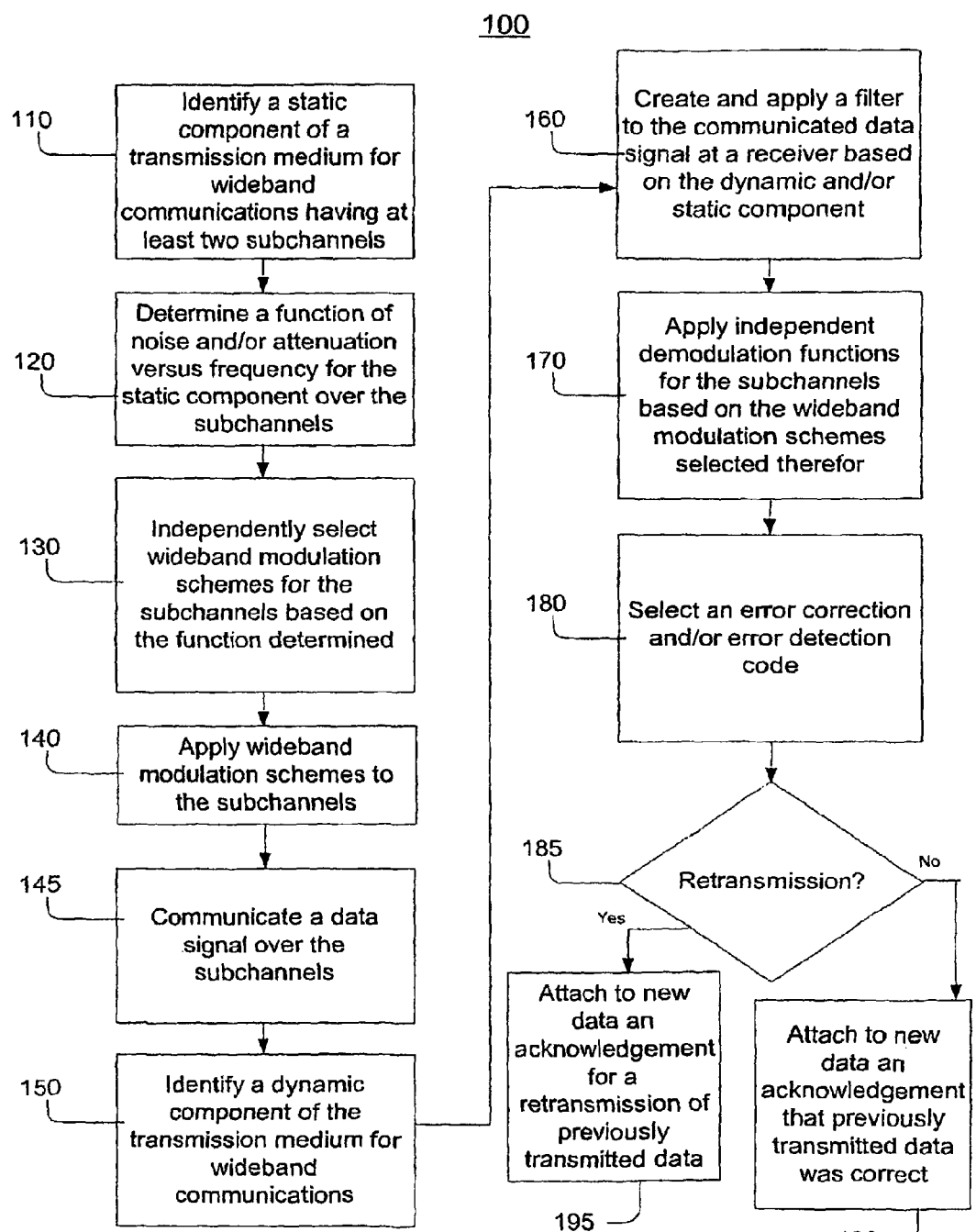
FIG. 1 is a flow chart of an exemplary process for communicating data.

For certain media, each of the noise and attenuation, as functions of frequency, may exhibit both a static and a dynamic component. The static component typically refers to a predictable or average function that is independent or relatively independent of time and possibly location (given the same cable parameters, such as type and length of cable at each location). For example, the typical signal attenuation on a transmission medium (e.g., a power line or a telephone wire) of a static configuration and long length (for example, several thousand feet) is an increasing function of frequency. This average, static function of signal attenuation versus frequency may be predictable based upon models of the particular cable. Similarly, there may be typical time-independent or static values of background noise as a function of frequency. The static component may include noise and/or attenuation as a relatively static function of frequency. The dynamic component generally refers to variations in both time and location of noise or attenuation versus frequency due to, for example, different devices or taps being connected to the wire at different times or locations. For example, for a measurement of noise and signal attenuation of a particular cable having a given type and length, the static function may be a useful estimate of future noise and signal attenuation that does not require further measurements; it also may correspond to an estimate of a time-averaged measurement.

A transmission medium may include a power line, a telephone line, a cable line, a digital subscriber line (DSL), an integrated services digital network (ISDN) line, a radio frequency (RF) medium, and/or other transmission media. In one exemplary implementation, a transmission medium may be identified in different segments and span from within a carrier's facility to access points outside of buildings and dwellings, to a cable riser in multi-tenant units and multi-dwelling buildings, and to one or more termination points within the buildings and dwellings.

In data communication systems, it may be desirable to increase or maximize the data throughput for signaling between particular locations. Two approaches to modulation for noisy media with frequency-dependent attenuation include (1) multicarrier modulation such as, for example, orthogonal frequency-division multiplexing (OFDM) or discrete multitone (DMT), which consists of many narrowband subchannels, or (2) wideband modulation. Narrowband modulation includes several different defining characteristics. In one defining characteristic, narrowband describes modulated channels where the frequency bandwidth includes small relative changes of attenuation versus frequency such that the attenuation versus frequency over the channel appears relatively flat. In another defining characteristic, narrowband describes modulated channels having a bandwidth that is relatively small compared to the carrier frequency. More specifically, in narrowband, one symbol interval occupies a large number of cycles of the carrier (e.g., approximately greater than 50 cycles). In yet another defining characteristic, narrowband describes transmissions with a channel bandwidth having a frequency typically ranging from 50 Hz to 64 kHz, which generally may be used for carrying voice information.

Wideband modulation also includes several different defining characteristics. In one defining characteristic, wideband describes modulated channels where the frequency bandwidth includes large relative changes of attenuation versus frequency such that the attenuation versus frequency over the channel bandwidth varies and does not appear relatively flat. In another defining characteristic, wideband describes modulated channels having a bandwidth that is wide relative to the carrier frequency. More specifically, in wideband, one symbol interval occupies a small number of cycles of the carrier (e.g., approximately less than 50 cycles). In yet another defining characteristic, wideband describes transmissions with a channel bandwidth greater than 64 kHz.

OFDM or DMT modulation typically use many subchannels such that each subchannel has a band that is sufficiently narrow to minimize the variation of attenuation or noise over the frequency band of that subchannel. The aggregate of all the subchannels forms a symbol, which is sufficiently long in length to accommodate the slow signaling rates of the narrowband subchannels (where the signaling rate of each subchannel is slow as it is narrowband). If the subchannel signal-to-noise ratio (SNR) can be calculated, then the optimal modulation for that subchannel can be determined. The SNR for any particular subchannel generally is made available to train the transmitter how to load that subchannel. In order to maximize the data throughput, the transmitter typically is updated periodically with the SNR or similar information for each subchannel. Such updates typically are performed using transmissions back from the receiver at a rate that exceeds the time variation of the SNR. For example, if a time-variation in the noise or attenuation impairs the performance of a particular subchannel, the data on that subchannel may be subject to a high error rate which may compromise the ability to recover the data in the symbol until the transmitter can be updated with the lower SNR for that channel. Consequently, in the case of significant time-variation of noise and/or attenuation characteristics, the performance of OFDM or DMT may be compromised by the long symbol lengths and the requirements of transmitter training.

OFDM or DMT may be used when significant variations of attenuation as a function of frequency (i.e., a high frequency-selectivity of the channel) would result in intersymbol interference (ISI) spread over large numbers of symbols when using high data rates. With single carrier wideband modulation, a time-domain equalizer may not be feasible for such a channel due to the large number of taps that are necessary for the single carrier wideband modulation. By contrast, with frequency domain equalization (FOE), single carrier wideband modulation may become feasible under such conditions. With wideband modulation using FDE, the energy of an individual symbol generally is distributed over the whole available frequency band and consequently, narrowband noise or narrowband notches in the channel transfer function have only a small impact on the error rate. Such impairments may affect OFDM or DMT without training, but with training may be overcome. However, rapid time variations in the frequencies of narrowband noise or notches in frequency selective channels typically do not affect the performance of wideband modulation with FDE, but may affect OFDM or DMT even with training as previously noted.

To optimize throughput at a high SNR, a modulation scheme typically is selected with the largest number of bits per symbol providing an acceptable error rate. For example, in a channel where the attenuation and/or noise is a static function of frequency and the attenuation generally increases linearly with frequency, consequently the SNR decreases as a function of frequency. In this example, if single-carrier wideband modulation is used, the selection of the modulation scheme with the consequent number of bits per symbol, and the resulting throughput becomes a compromise. In this example, if OFDM or DMT are used, the modulation scheme for each subchannel may be optimized for high throughput and the number of bits per symbol may decrease as a function of frequency for each subchannel.

However, when the noise and attenuation include more than just static functions of frequency and also are dynamic and highly sensitive to frequency selection, then the performance of OFDM or DMT modulation may become impaired for the reasons noted above. If the modulation schemes for each subchannel were selected based only on the static function that did not account for the dynamics of the noise and attenuation, then the available bandwidth for using OFDM or DMT may be compromised by not being able to take advantage of the full available bandwidth. The available bandwidth may compromised as the performance of the selected OFDM or DMT modulation becomes highly susceptible to further noise and/or attenuation as a dynamic function of frequency. The noise and/or attenuation as a dynamic function of frequency reduces the SNR below the threshold needed for the selected modulation scheme, which was selected based only on the static function, to remain operative in the higher frequency subchannels.

For media with noise and attenuation that vary with frequency as both static and dynamic functions, one optimal approach may include two elements. First, wideband modulation may be used to handle noise and/or attenuation as a dynamic and highly selective function of frequency to increase or maximize available bandwidth. Second, a modulation scheme with as large as possible number of bits per symbol may be used to maximize throughput for noise and/or attenuation as a static function of frequency. This may be achieved by wideband modulation not with a single carrier but with a small number of carriers, for example, approximately 2 to 12, rather than the approximately 100 to 1000 used in OFDM or DMT. For example, in a 10 MHz channel, each carrier could be spaced a few megahertz apart rather than a few kilohertz apart for OFDM and DMT. Improved or optimal modulation for each of these few carriers may be selected to achieve improved or optimal throughput given the SNR due to the static function over the bandwidth of that modulated carrier. Due to the modulation being wideband, there typically is immunity to frequency-selective noise and attenuation and the ability to optimally handle rapid time variation of such frequency-selective noise and attenuation and consequently the availability of much wider usable bandwidth.

FIG. 1 illustrates a process 100 for communicating data using wideband modulation having at least two subchannels. Process 100 typically includes identifying a static component of a transmission medium for wideband communications having at least two subchannels (step 110). A function of noise and/or attenuation versus frequency is determined for the static component (step 120). A wideband modulation scheme is selected for each of the subchannels based on the function determined (step 130), the wideband modulation schemes are applied to the subchannels (step 140), and a data signal is communicated over the subchannels (step 145). A data signal may include data, data gaps, noise, data frames, inter-frame gaps, and preambles.

In one exemplary implementation, the static component of the transmission medium for the wideband communications may be identified prior to dividing the transmission medium into the at least two wideband subchannels (step 110), and a function of noise and/or attenuation versus frequency is determined for the static component (step 120). Then a wideband modulation scheme is selected independently for the subchannels based on the function determined (step 130), applied to the subchannels (step 140), and a data signal is communicated over the subchannels (step 145).

In another exemplary implementation, the transmission medium for the wideband communications may be separated into at least two wideband subchannels before the static component is identified independently for the resulting subchannels (step 110). In this implementation, functions of noise and/or attenuation versus frequency are determined independently for the static component of subchannels (step 120) and then wideband modulation schemes are selected independently for the subchannels based on the determined functions (step 130), applied to the subchannels (step 140), and a data signal is communicated over the subchannels (step 145).

In another exemplary implementation, the function of noise and/or attenuation versus frequency may be determined based on an infrequent measurement of the noise and/or attenuation versus frequency over the usable bandwidth (step 120). The wideband modulation scheme may be selected at the time of the infrequent measurement (step 130), applied to the subchannels (step 140), and a data signal is communicated over the subchannels (step 145). The infrequent measurement includes measurements that are taken on a non-regular basis at a time interval greater than a frame-by-frame interval. Additionally or alternatively, the function of noise and/or attenuation versus frequency may be determined by averaging the function of noise and/or attenuation versus frequency for the static component over a period of time.

In one implementation, wideband modulation schemes may be selected independently for several or each of the subchannels to improve or optimize orthogonality between the subchannels (step 130). Each such modulated carrier (individual subchannel) may be made non-interfering or orthogonal to the others (for example, with each carrier being an integer multiple of cycles over a symbol period) and resultant short symbols may result from the combination of all such individual channels. This approach allows the modulation schemes for each of the carriers to be improved or optimized, for example, to achieve an increased or highest total throughput at a required error rate based upon the static functions of noise and attenuation versus frequency. The improvement or optimization also may include the constraint of maximum total power or power spectral density. One exemplary modulation scheme to optimize orthogonality between the subchannels includes offset quadrature amplitude modulation (OQAM).

In one exemplary implementation, the wideband modulation schemes may be independently selected for the subchannels (step 130) and the selected modulations schemes may be applied to multiple data frames (step 140). When the wideband modulation schemes are selected based on the static component (step 130), then new modulation schemes may not be selected until a change is recognized with respect to the static component. Thus, once the modulation schemes are selected (step 130), those same modulation schemes may be applied to multiple data frames (step 140).

A dynamic component of the transmission medium for wideband communications also may be identified (step 150). Typically, the dynamic component includes noise and/or attenuation that varies as a function of frequency.

A filter may be created or applied to the communicated data signal at a receiver based on the dynamic and/or the static components (step 160). For example, in one implementation, the dynamic component may be used to create and apply an adaptive filter to the communicated data signal. The adaptive filter may include a channel filter, a noise filter, and/or a frequency-domain equalizer. The adaptive filter may be created by averaging the function of noise and/or attenuation versus frequency. Additionally or alternatively, the adaptive filter may be created by taking an average of the elements of the adaptive filters over a period of time. This approach may optimally handle channels with dynamic functions of noise and attenuation versus frequency that may be highly frequency-selective by preserving short symbol times with the energy of each individual modulated carrier distributed over a wide spectrum.

In another implementation, the static component may be used to create and apply a filter to the communicated data signal at a receiver (step 160). The filter may include a channel filter, a noise filter, and/or a frequency-domain equalizer. The filter may be created by averaging the function of noise and/or attenuation versus frequency. Additionally or alternatively, the filter may be created by taking an average of the elements of the filters over a period of time.

Independent demodulation functions may be applied to each of several subchannels based on the selected wideband modulation schemes (step 170). Applying independent demodulation functions may include using separate demodulators for each subchannels and/or separate demodulation algorithms for each of the subchannels.

Figure 2:
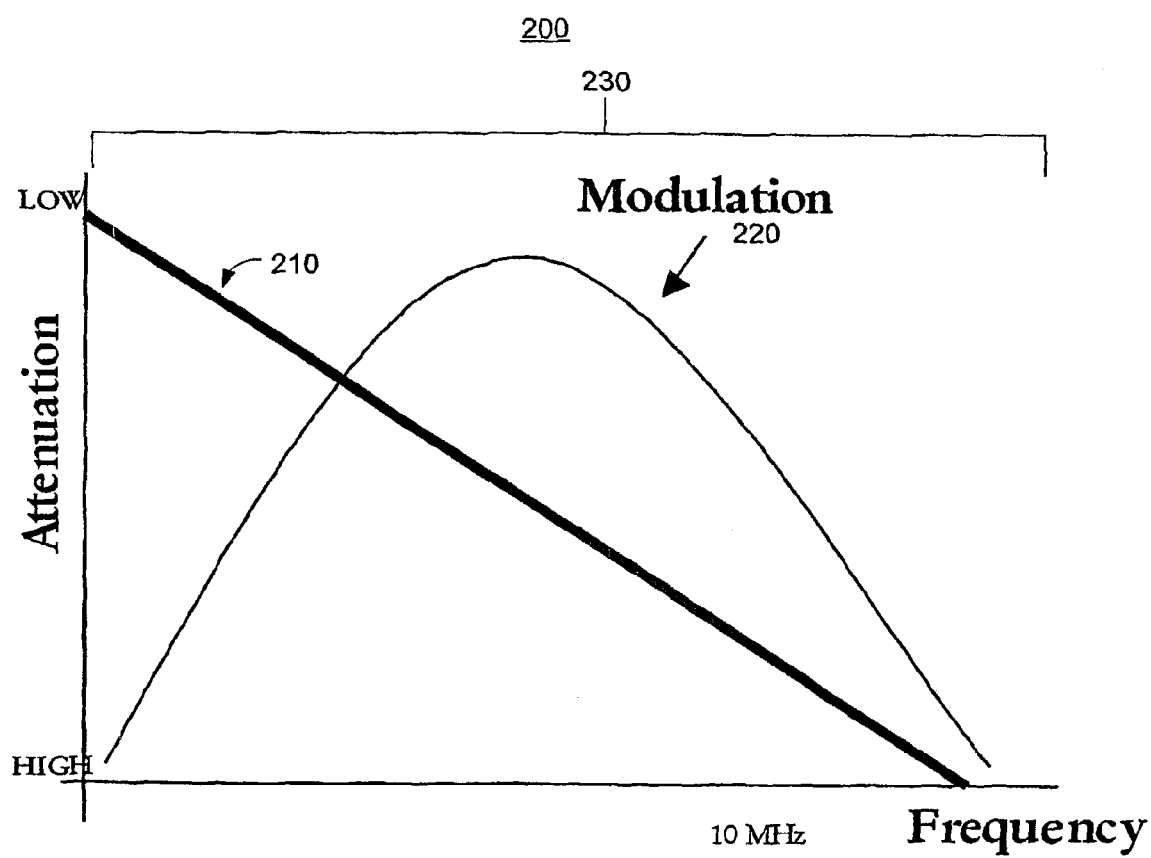
FIG. 2 is a graph of an exemplary curve of attenuation versus frequency with a single channel of wideband modulation.

FIG. 2 illustrates a graph 200 of the steep curve 210 of attenuation increasing with frequency resulting in a higher attenuation (HIGH) at higher frequencies. Systems that experience similar characteristics include long distance telephone wiring, which may encounter attenuation versus frequency that is a steep curve increasing with frequency. As illustrated, using wideband modulation as represented by power spectral density (PSD) curve 220 with a single channel 230 leads to an inefficient match of the modulation 220 to the steepness of the attenuation curve 210. For example, the attenuation experienced by different frequency channels generally tends to vary in this manner based on the length of the wire.

Figure 3:
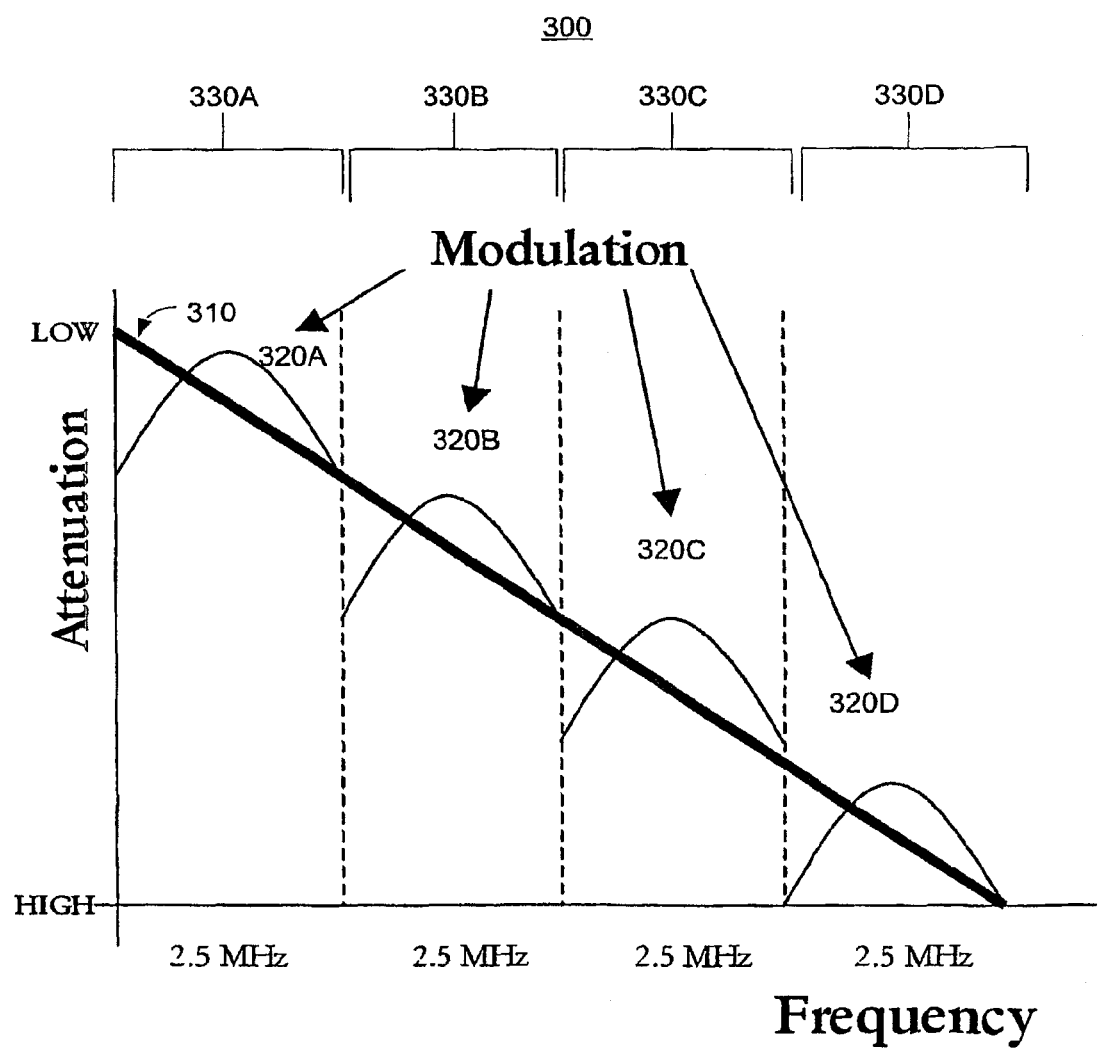
FIG. 3 is a graph of an exemplary curve of attenuation versus frequency with multiple channels of wideband modulation.

FIG. 3 illustrates a graph 300 showing that improved communications may be achieved by choosing a few individual channels 330A, 330B, 330C, 330D to preserve wideband modulation and by varying modulation schemes 320A, 320B, 320C, 320D according to the predicted attenuation curve 310 of the corresponding individual channel (e.g., the most complex modulation may be applied to the lowest frequency channel), while preserving the wideband characteristics of the modulation in order to handle the dynamic noise characteristics of the transmission medium (e.g., telephone wiring) over the widest possible bandwidth, thereby achieving a highest possible throughput.

Figure 4:
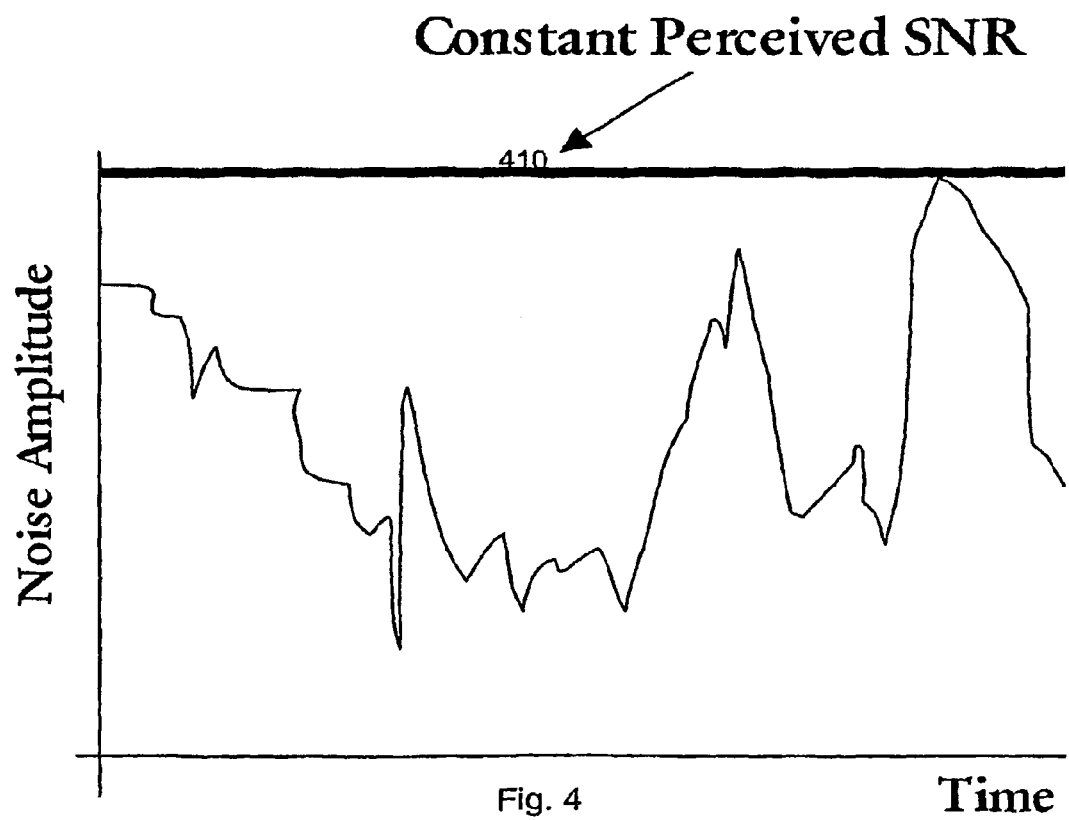
FIG. 4 is a graph of an exemplary curve of noise amplitude versus time with a constant perceived signal-to-noise ratio (SNR).

FIG. 4 illustrates a graph 400 of dynamic noise amplitude over time with a constant perceived SNR 410, which may result in lower speed data communications.

Figure 5:
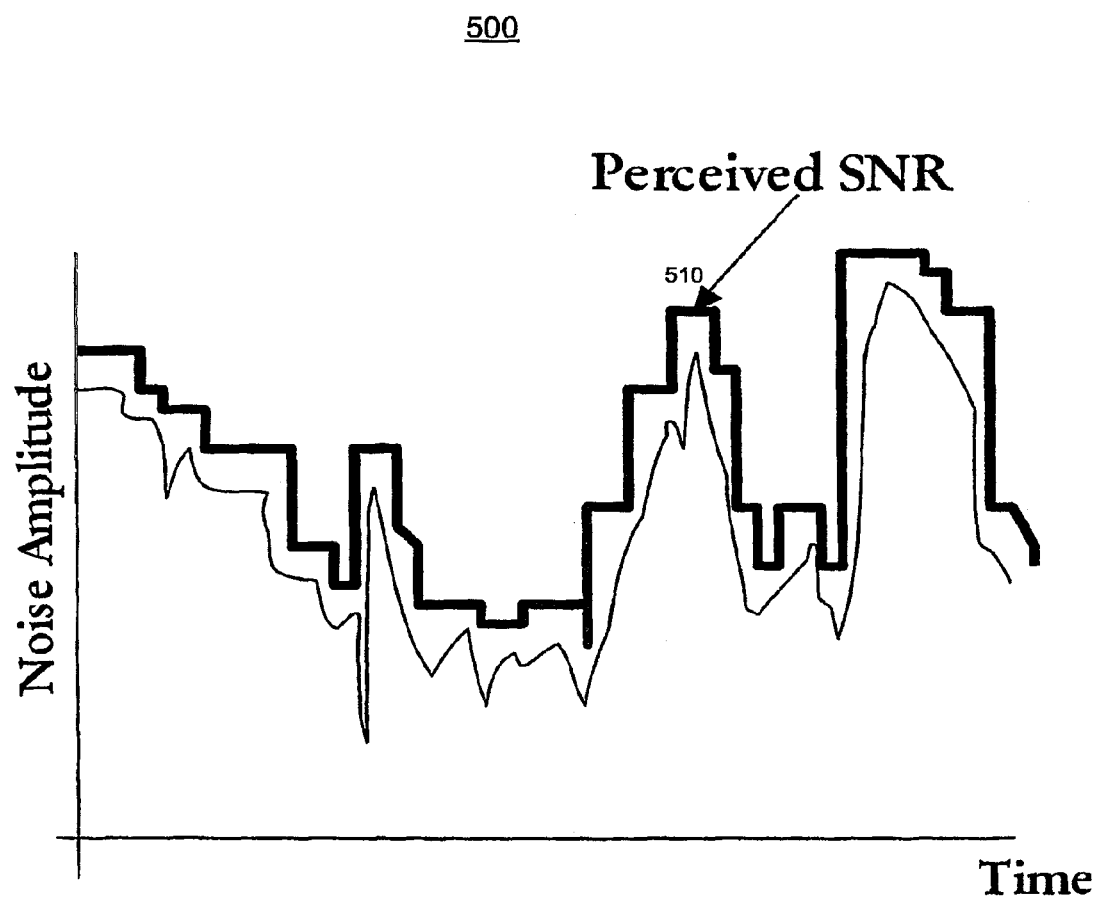
FIG. 5 is a graph of an exemplary curve of noise amplitude versus time with a dynamically adapted SNR.

FIG. 5 illustrates a graph 500 of the noise amplitude over time with a perceived SNR 510 that is dynamically adapted by identifying the dynamic component (e.g., the dynamic noise component), creating and applying an adaptive filter based on the dynamic component. This "on-the-fly" frequency-domain equalization improves the speed of the data communications.

Referring back to FIG. 1, process 100 may further include selecting error correction and/or error detection codes (step 180). Forward error correcting codes typically are applied to the transmitted data to achieve a particular bit error rate. The forward error correction (FEC) is typically selected to achieve an error rate that can handle worst-case channel conditions. However, in dynamic channels, there may be times when the correcting bounds of the FEC are exceeded. With the short symbol lengths and low latency processing enabled by this approach, the data may be transmitted into short frames composed of blocks incorporating both forward error correction and error detection, which may be acknowledged by the receiver using the error-detecting code to determine which blocks were not corrected by the FEC. This allows for a low-level link protocol that may achieve a lower bit error rate through retransmission by the transmitter of any blocks that were unable to be corrected by the FEC, as determined by the acknowledgements received from the receiver.

In addition, if a retransmission is necessary (step 185), an acknowledgement for a retransmission of previously transmitted data may be attached to new data (step 195). When a retransmission is required, the block of data that requires retransmission to the opposite node also may be attached to the new data along with the acknowledgement for the data transmitted by the opposite node. Using "piggyback" acknowledgements enables data to be sent in both directions at higher efficiencies. More specifically, for example, higher efficiencies may be realized because the number of different transmissions between a sender and receiver are reduced by attaching to new data both acknowledgements for retransmissions and, acknowledgements that the data received was correct. The combination of (i) piggyback acknowledgements and (ii) short frame lengths and low-latency processing made possible by using multiple wideband channels enables a communication system incorporating these features to provide low latency communications to an application. If an acknowledgement for a retransmission of previously transmitted data is not necessary, then an acknowledgement indicating that the data transmitted was correct may be attached to and transmitted with new data (step 190).

FIG. 6 illustrates an exemplary table 600 illustrating throughput versus dynamically varying bit error rates (BERs) for an exemplary set of parameters. The parameters may include a raw bit rate (e.g., 100 Mbps), which is the speed at which bits are transmitted over a communications path, that is typically expressed in bits per second. The FEC overhead (e.g., 2:1) includes additional redundant portions of a frame that is added by the FEC code and that is expressed as a ratio of total information transmitted to actual information presented for delivery. The propagation 15 delay (e.g., 11.43 μs) includes a time for transit of a signal from one point on a circuit, link, network, or system to the other point. The block size (header, body, CRC) (e.g., 2, 64, 2) includes the size of a data block prior to FEC encoding that is typically expressed in bytes. The blocks per frame (e.g., 32) includes the number of data blocks contained within a single frame. The BER includes the ratio of the mean number of bit errors in any given interval to the total number of bits in that interval. The block error rate includes the ratio of the mean number of block errors in any given interval to the total number of blocks in that interval. The throughput includes the average rate at which application information is communicated during a specified period of time. Throughput may be used as a figure of merit for a system as it excludes the overhead introduced by the system such as error control coding and protocol overhead. The post-FEC BER includes a bit error rate as applied to the bit stream received after FEC decoding has been performed.

For example, as the noise may vary significantly over time, transmitter training on a fast enough time scale may not be relied upon. Under a conventional approach, a modulation and FEC must be used for the worst case to always deliver, for example, a BER of $10^{-9}$ or less, which compromises throughput. However, using short frames and low-latency processing of both the FDE and the FEC, dynamic fluctuations in the post-FEC BER, can still deliver a final BER of $10^{-9}$ or less while using a more complex modulation and less coding overhead for higher throughput, through a low-latency ARQ using piggyback acknowledgements. Table 600 illustrates the maintenance of the delivered throughput under dynamically-varying BERs for the given set of parameters.

Figure 7:
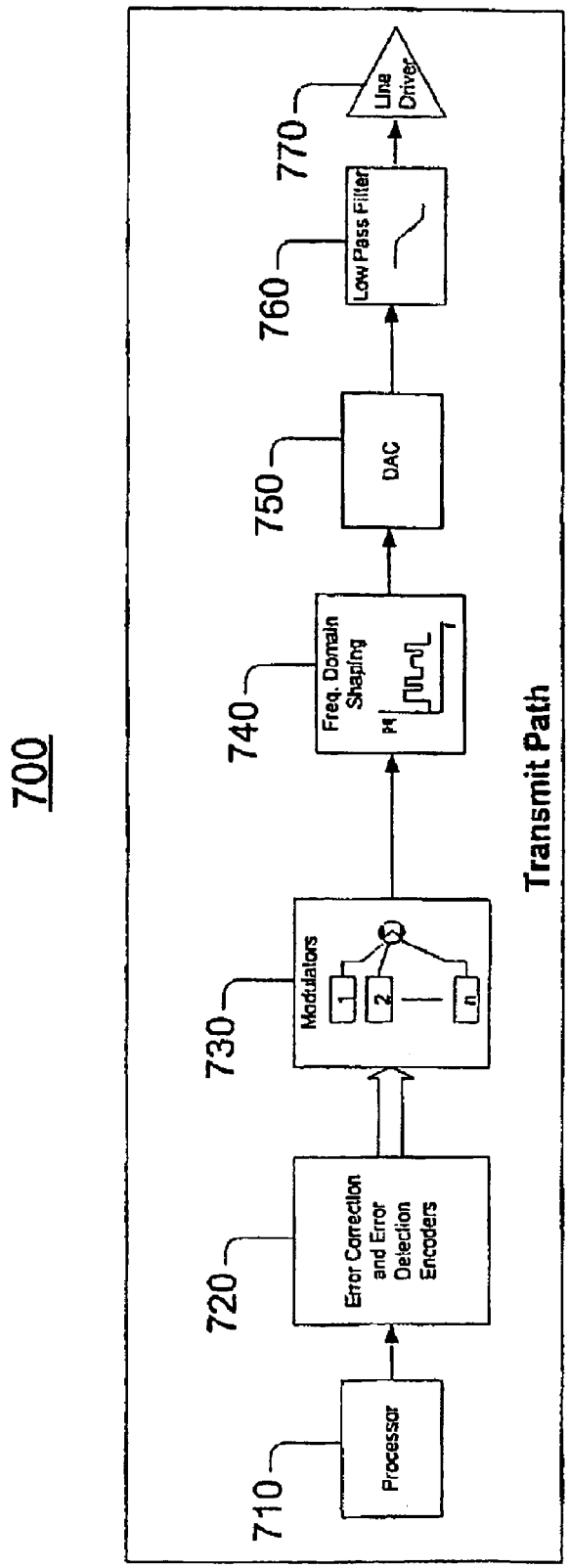
FIG. 7 is a block diagram of an exemplary transmit path.

FIG. 7 illustrates an exemplary transmit path 700 used to implement the features described above with respect to FIGS. 1-6. Transmit path 700 typically includes a processor 710, error correction and/or error detection encoders 720, one or 10 more modulators 730, a frequency domain shaping filter 740, a digital analog converter (DAC) 750, a low pass filter 760, and a line driver 770.

Processor 710 interfaces the data communications system to the user. It may run the communications protocols, for example, segmentation and reassembly, packetizing data, retransmitting blocks of data that were received incorrectly as determined by the error detecting code, and sending acknowledgements (ACKs or NAKs), such as piggyback ACKs or NAKs to determine whether blocks of data were received correctly or incorrectly. Depending on the application and on the processor, the task list may include any functionality deemed suitable to be performed by a CPU.

Error correction and/or detection encoders 720 performs the data encoding. For example, it may apply an error detecting code to a block of data, followed by a forward error correcting (FEC) code to words of data within the block. The complexity of the FEC code can be dependent on the expected quality of the channel or subchannels (i.e., if the channel or subchannel is characterized by a high signal-to-noise ratio (SNR), a simple code, if any, could suffice), the coding overhead, and the desired Symbol Error Rate (SER) or Bit Error Rate (BER) at the receiver.

The input from the processor 710 to the encoders 720 may be one or more bit streams. The stream(s) could be encoded either as one stream or segmented as separate independent streams and then encoded for each subchannel to be then modulated by the modulators 730. Where only one bit stream is encoded, segmentation into multiple streams for each subchannel may be performed before sending that subchannel to the modulators 730. More specifically, the segmentation into multiple streams could occur before applying the error detecting code(s), after applying the error detecting code(s) and before applying the forward error correcting code(s), or after applying both the error detecting code(s) and the forward error correcting code(s).

The input data streams are modulated by the modulators 730 for each subchannel with the modulation constellation/complexity determined for each subchannel (e.g., BPSK, QAM, QAIvl 8, QAM 16, QAM 32, QAM 64, QAM 128, QAM 256, QAM 1024). The modulated streams are then combined/added together and sent to the frequency-domain shaping filter 740.

The frequency-domain shaping filter 740 can be used to reduce emissions in particular parts of the frequency band. For example, the transmitted signal can be notched such that it will not interfere with the amateur radio (HAM) bands, amplitude modulation (AM) bands, and even with other modems. The filter can be used to adjust the PSD of the transmitted signal.

DAC 750 converts the digital signal to an analog waveform. Low pass filter 760 smoothes the DAC output and removes the undesired high frequency bands. Line driver 770 boost the signal power to an appropriate level for transmission.

Figure 8:
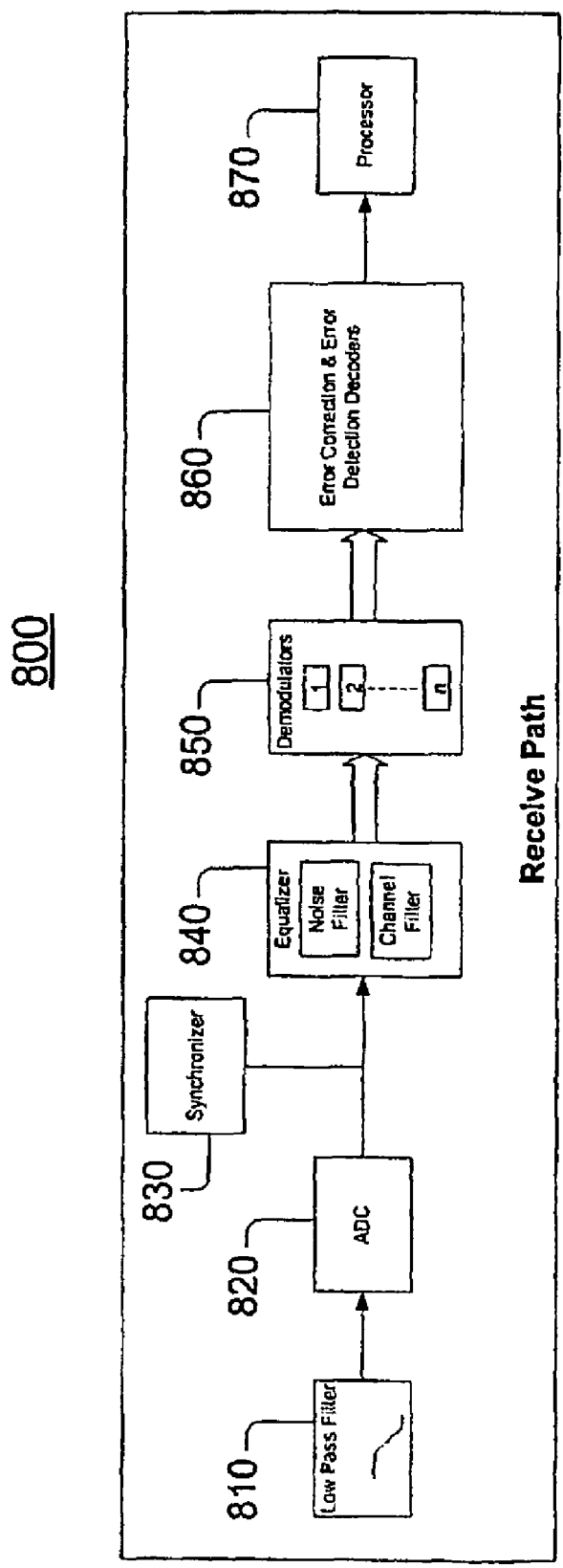
FIG. 8 is a block diagram of an exemplary receive path.

FIG. 8 illustrates an exemplary receive path 800 used to implement the features described above with respect to FIGS. 1-6. Receive path 800 typically includes a low pass filter 810, an analog digital converter (ADC) 820, a synchronizer 830, an equalizer 840, one or more demodulators 850, error correction and/or error detection decoders 860, and a processor 870.

Low pass filter 870 acts as an anti-aliasing filter. ADC 820 converts the incoming analog signal to a digital signal. Synchronizer 830 determines the beginning of a received data frame. In addition, it 830 can be used to maintain proper bit timing at the receiver location. To determine if a frame is received, the incoming signal can be correlated to a predefined and stored transmitted preamble. Decision logic analyzes the correlation results and determines if the received sequence is a match to the transmitted preamble. This process can be repeated until a match is found.

Equalizer 840, for example an adaptive frequency-domain equalizer constructed from both a channel and noise filter, may be used to recover the transmitted data over a noisy transmission channel with frequency-domain attenuation. The equalizer may be designed to analyze the channel and adapt to the 5 channel noise and to the channel attenuation/distortion. The equalizer reduces or eliminates noise and corrects for the channel attenuation/distortion to reduce or eliminate inter-symbol interference (ISI) and/or inter-channel interference (ICI). In one implementation, equalizer 840 may be constructed using two filters: a noise filter and a channel filter. The combination of the two filters can be used to generate a filter such as a Wiener filter or another filter as an alternative, or as capable of being used in combination, or as an optimal filter. Constructing the frequency-domain equalization channel and noise filter may include using one or more samples of the noise in the inter frame gap (IFG), the received preamble, and the transmitted preamble.

Demodulators 850 receives the input stream, subdivides or segments the incoming stream into subchannels, and then demodulates each subchannel. The demodulators 850 have knowledge of the modulation constellation for each subchannel.

Error correction and detection decoders 860 used is described above with regard to the transmitter in FIG. 7. The processing of the decoding and reassembly of the streams is in the required order and sequence as determined by the transmitter construction.

Processor 870 interfaces the data communications system to the user and can also run the communications protocols, including whether acknowledgements (ACKs or NAKs) should be sent as to whether blocks of data were received correctly or incorrectly. Depending on the application and on the processor, the task list could include any functionality deemed suitable to be performed by a CPU.

Once the data has been received, demodulated, decoded, and reassembled from the received blocks into application data it will be sent to the user.

Figure 9:
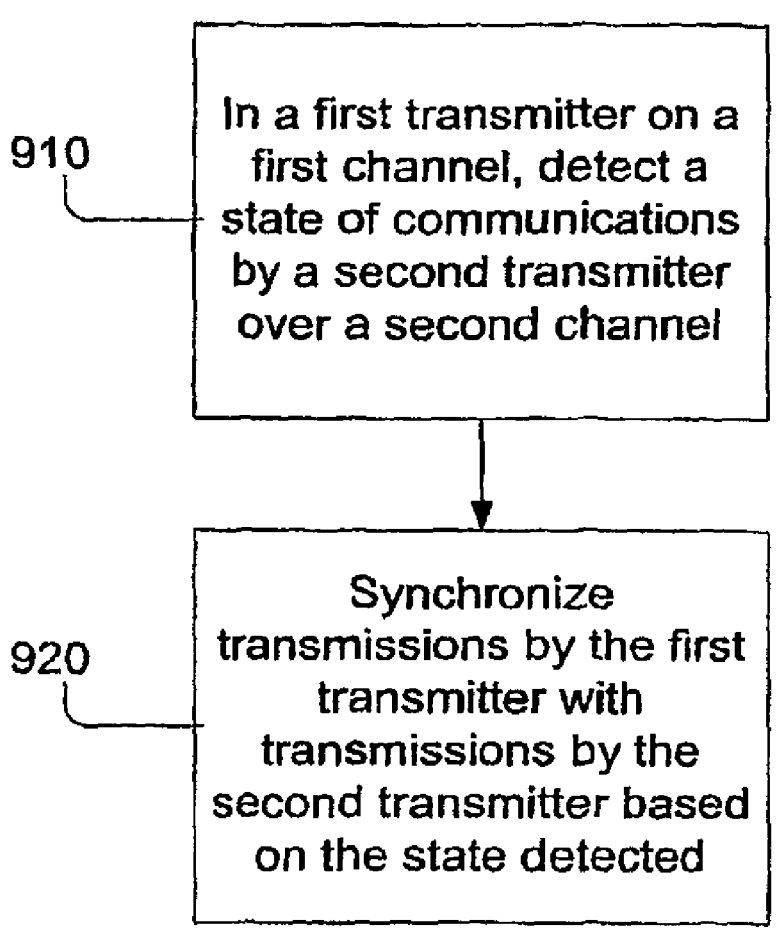
FIG. 9 is a flow chart of an exemplary process for communicating data.

FIG. 9 illustrates a process 900 for communicating data. Process 900 typically includes using a first transmitter on a first channel to detect a state of communications by a second transmitter over a second channel (step 910). Transmissions by the first transmitter are synchronized with transmissions by the second transmitter based on the state detected (step 920). The first channel may include a first wire and the second channel may include a second wire that differs from the first wire. The state of communications includes a receiving state and a transmitting state. In general, process 900 may be applied when the frame sizes are fixed.

More specifically, for media with high crosstalk such as telephone wiring, each transmitter may synchronize its transmission to that of other wire pairs by first detecting transmissions on other channels at its end of the loop and then synchronizing its transmission to coincide in time with such transmissions (to reduce or eliminate the effect of crosstalk on reception that would occur if reception coincided with transmission on other pairs).

Figure 10:
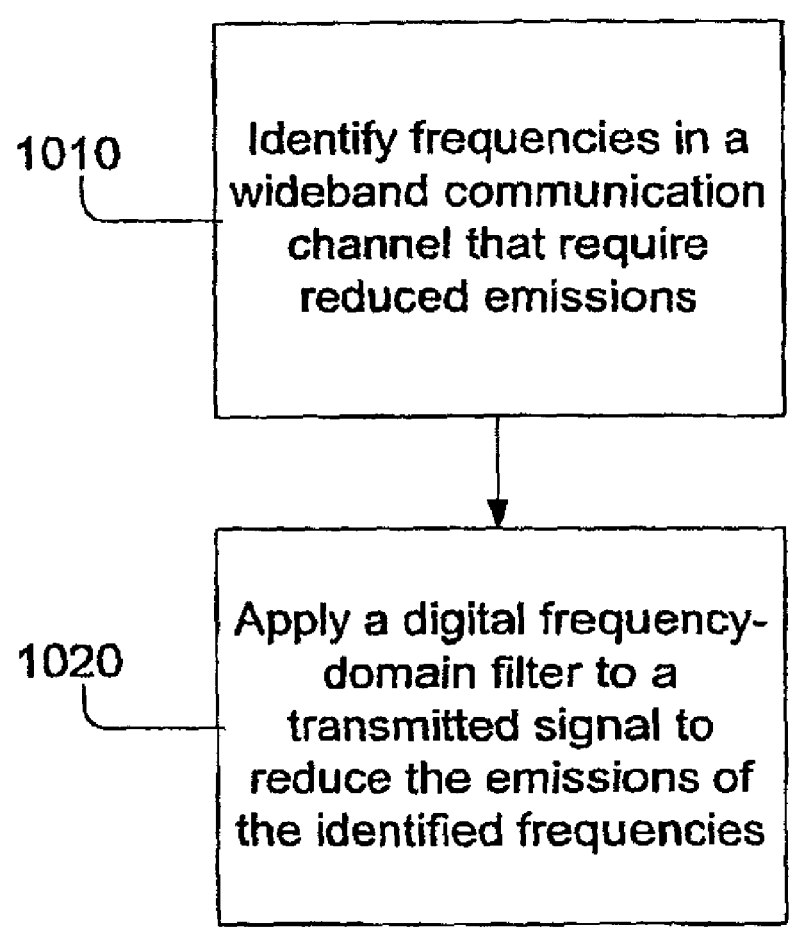
FIG. 10 is a flow chart of an exemplary process for communicating data.

FIG. 10 illustrates a process 1000 for communicating data that includes identifying frequencies in a wideband communication channel that require reduced emissions (step 1010). A digital frequency-domain filter may be applied to a transmitted signal to reduce the emissions of the identified frequencies (step 1020). In one exemplary implementation, the frequencies that require reduced emissions may be identified by a regulatory agency, such as, the Federal Communications Commission (FCC). Additionally or alternatively, the frequencies that require reduced emissions may be identified so as to reduce interference with other devices and communications.

More specifically, as wideband modulation can handle notches, multiple, precisely-located notches may be applied to the transmitted signal by digital frequency-domain filtering to reduce emissions in particular parts of the frequency band and thus to minimize interference with multiple existing RF transmissions, such as amateur radio bands.

The described systems, methods, and techniques may be implemented in digital electronic and/or analog circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of nonvolatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A method for communicating data over a transmission medium having at least a first subchannel and a second subchannel, the method comprising:
    identifying a static component of the transmission medium, wherein the static component is identified prior to dividing the transmission medium into the first subchannel and the second subchannel;
    determining a first function of noise versus frequency or a first function of attenuation versus frequency for the static component over the first subchannel;
    determining a second function of noise versus frequency or a second function of attenuation versus frequency for the static component over the second subchannel, wherein the determination of the second function is made independently from the selection of the first function;
    selecting a first wideband modulation scheme for the first subchannel based upon the determined first function;
    selecting a second wideband modulation scheme for the second subchannel based upon the determined second function, wherein the selection of the second wideband modulation scheme is made independently from the selection of the first wideband modulation scheme;
    communicating a first portion of the data over the first subchannel using the first wideband modulation scheme; and
    communicating a second portion of the data over the second subchannel using the second wideband modulation scheme.

2. The method of claim 1, further comprising:
    identifying a dynamic component of the transmission medium;
    applying an adaptive filter to the communicated data at a receiver, wherein the adaptive filter is based upon the identified dynamic component.

3. The method of claim 1, further comprising:
    applying a filter to the communicated data at a receiver, wherein the filter is based upon the static component.

4. The method of claim 1, further comprising:
    applying a first demodulation function based upon the first wideband modulation scheme to the communicated first portion of the data; and
    applying a second demodulation function based upon the second wideband modulation scheme to the communicated second portion of the data, wherein the second demodulation function is independent of the first demodulation function.

5. The method of claim 1, further comprising:
    selecting a forward error correction (FEC) code;
    applying the selected forward error correction code to the communicated data; and
    determining whether retransmission is necessary.

6. The method of claim 5, further comprising:
    attaching, upon a determination that retransmission is necessary, to new data an acknowledgment that that retransmission is necessary because previously transmitted data was not correct.

7. The method of claim 5, further comprising:
    attaching, upon a determination that retransmission is not necessary, to new data an acknowledgment that retransmission is not necessary because previously transmitted data was correct.

8. A method for communicating data over a transmission medium having at least a first subchannel and a second subchannel, the method comprising:
    dividing the transmission medium into a first subchannel and a second subchannel;
    identifying a first static component of the transmission medium for the first subchannel;
    identifying a second static component of the transmission medium for the second subchannel, wherein the second static component is identified independently from the first static component;
    determining a first function of noise versus frequency or a first function of attenuation versus frequency for the first static component over the first subchannel;
    determining a second function of noise versus frequency or a second function of attenuation versus frequency for the second static component over the second subchannel, wherein the determination of the second function is made independently from the selection of the first function;
    selecting a first wideband modulation scheme for the first subchannel based upon the determined first function;
    selecting a second wideband modulation scheme for the second subchannel based upon the determined second function, wherein the selection of the second wideband modulation scheme is made independently from the selection of the first wideband modulation scheme;
    communicating a first portion of the data over the first subchannel using the first wideband modulation scheme; and
    communicating a second portion of the data over the second subchannel using the second wideband modulation scheme.

9. The method of claim 8, further comprising:
    identifying a dynamic component of the transmission medium;
    applying an adaptive filter to the communicated data at a receiver, wherein the adaptive filter is based upon the identified dynamic component.

10. The method of claim 8, further comprising:
    applying a filter to the communicated data at a receiver, wherein the filter is based upon the static component.

11. The method of claim 8, further comprising:
    applying a first demodulation function based upon the first wideband modulation scheme to the communicated first portion of the data; and
    applying a second demodulation function based upon the second wideband modulation scheme to the communicated second portion of the data, wherein the second demodulation function is independent of the first demodulation function.

12. The method of claim 8, further comprising:
    selecting a forward error correction (FEC) code;
    applying the selected forward error correction code to the communicated data; and
    determining whether retransmission is necessary.

13. The method of claim 12, further comprising:
    attaching, upon a determination that retransmission is necessary, to new data an acknowledgment that that retransmission is necessary because previously transmitted data was not correct.

14. The method of claim 12, further comprising:
    attaching, upon a determination that retransmission is not necessary, to new data an acknowledgment that retransmission is not necessary because previously transmitted data was correct.

* * * * *